United States Patent Office 3,268,429
Patented August 23, 1966

3,268,429
METHOD OF CLEANING MOLD EQUIPMENT
Tom Jay Farrow, Toledo, Ohio, assignor to Owens-Illinois Inc., a corporation of Ohio
Filed June 17, 1963, Ser. No. 288,329
19 Claims. (Cl. 204—145)

This invention relates to a process for cleaning molds and mold equipment used in the forming of glass articles.

More particularly, this invention relates to a method of cleaning molds and mold equipment used in the glass forming art which is electrochemical in nature, wherein the molds do not require any polishing, grinding or physical wearing down of the metal to accomplish the cleaning thereof.

To provide a clear understanding of the process of the invention it is necessary to be familiar with the types of materials that it is necessary to remove from the metal surface. For the purpose of this application a "soil" will be defined as any unwanted material on any surface of a piece of glass molding equipment which is placed there or formed there as a result of the glass forming operation.

The oxides of iron, namely ferric oxide ($Fe_2O_3$) and ferrosoferric oxide ($Fe_3O_4$), comprise the majority of oxide soil that is found on the glass forming surfaces and are the primary constituents on all non-finish equipment such as blow molds, bottom plates, blow heads and a number of the blanks. It should be noted that the mold equipment used in the glass forming art is made of ferrous metal, principally cast iron.

$Fe_3O_4$ appeared to be much more prevalent on the glass forming or glass contact surfaces than $Fe_2O_3$. This material is usually a black adherent film and is commonly called "carbon" by plant personnel. This, however, is a misnomer as can readily be determined by a simple magnet test that will demonstrate the difference between carbon and $Fe_3O_4$.

The remaining oxide $Fe_2O_3$ can be described as a red or brown or orange, non-magnetic, loose, fairly powdery type of material. A classic example of $Fe_2O_3$ is ordinary red rust as found on exposed steel parts in the atmosphere.

The majority of the soil on the exterior of finish equipment, such as neck rings and also the top of some blank molds, is comprised principally of carbonaceous material. This carbonaceous material is broken down into three groups. It should be kept in mind that the three groups listed below all originate from the same material, such as mold dope, but take on three more or less distinct physical properties.

The first group includes and is comprised primarily of "as-applied" mold dope. This mold dope can be best described as having the consistency of thick grease and is fairly easily removed with the hand or a rag. This material is easily removed by a simple degreasing operation and is found primarily on a set of equipment that has been on the machine or in operation a short period of time such as only a few hours. As an example, the outer layer of soil on the back of the neck ring is primarily "as-applied" mold dope.

The second group which is found on the reverse side of a neck ring is comprised of baked-on carbonaceous material that is formed from mold dope but has turned to a solid or semi-plastic material. This material tends to be gummy or rubbery and more or less resilient when scraped with a knife. The main difference between this material and the previously mentioned material is that this cannot be removed readily in a degreasing operation, as much of the binder has been volatilized due to heat from the forming operation. This material, which is mold dope residue comprising graphite, hydrocarbon and organic material, tends to be very adherent and difficult to remove even by scraping.

The third type of carbonaceous material was found primarily on the interior surfaces of the neck ring such as the register location for the guide ring or collar. Due to the increased heat in this location in the neck ring, the majority of the binder is removed from the carbonaceous material and the carbon remaining is primarily of a loose type of coke. This coke for the most part was found to be non-adherent and in a black, powdery form. This material may be easily removed by light abrasion.

Although the above-referred to oxides and carbonaceous materials comprise the majority of soils found on forming equipment, there are also other types of soils noted such as dirt and broken glass, which was peened into a molding surface. These other minor types of soils are completely removed in any process that will remove the oxides and carbonaceous matter.

It has been the practice in the past to clean glassware forming mold equipment by several techniques. One well known method is solvent cleaning. The classic example of solvent cleaning is better known as vapor degreasing. Vapor degreasing is usually used to remove the bulk of soils readily soluble in chlorinated hydrocarbons such as inhibited trichloroethylene or perchloroethylene. These solvents under normal operating conditions will not attack steel or light metals. They will, however, if overheated, break down with the formation of free hydrochloric acid resulting in attack on the metal being degreased, in particular the light metals.

Although vapor degreasing does provide for efficient and rapid removal of oils, greases and waxes, it is not particularly adept at removing the majority of the carbonaceous material found on glass forming machine finish equipment and will not begin to remove any of the oxide material found on any equipment. The inability of a vapor degreaser to remove the carbonaceous matter from a piece of finish equipment is probably due to the fact that the mold dope has a slightly different form after being baked on the forming machine.

Prior to electrochemical cleaning, the majority of soil removal from mold equipment was accomplished by the use of mechanical abrasion. This mechanical abrasion may have taken the form of sand blasting, grit blasting, polishing with such things as abrasive paper or steel wool, vapor blasting, and more recently some of the newer and more advanced glass bead blasting equipment. All of the above-mentioned mechanical abrasion techniques do remove a measurable amount of metal besides the unwanted soil. Another detrimental factor is that these processes are all manual operations, wherein the speed of cleaning and damage to a mold is all determined by the operator's skill.

As abrasion is principally accomplished by friction of one material upon another, solids have primarily been considered for the abrasive materials. This does not mean, however, that liquids or gases cannot be used for abrasion, but as the friction between a liquid or gas and a solid is so small, the time consumed in abrading would be so great the process would certainly be un-economical. However, if a soil can be loosened chemically or electrochemically, it has been shown that abrasion by agitation of a liquid or a gas can remove the soil.

Typical forms of removing loosened soils by gas or liquid abrasion are the ultrasonic type cleaning, imposed current or electrocleaning, and spray cleaning.

A still further method presently employed is the scraping and brushing of the mold equipment entirely by hand.

As can readily be seen, all of the above-outlined methods involved, with the exception of chemical cleaning, to a greater or lesser extent, the use of material or equipment which will abrade, scratch or score the mold equipment as it is being cleaned.

Whenever mold equipment, such as neck rings, collars, funnels, plungers, blank and blow molds, baffles, thimbles and bottom plates, are scratched or abraded in cleaning, it is necessary that the equipment be reground and sized in order to insure that the equipment meets the specific dimensional requirements relative to use in the forming of glass articles.

Obviously, there is some wearing away of the metal in any of the presently known methods of cleaning mold equipment and, therefore, it is necessary to polish the mold equipment, particularly on those surfaces which form the glass contacting surfaces of the mold equipment so as to provide clean, oxide-free molding surfaces.

In the normal operation of a forming machine the mold equipment, such as the neck rings, blank molds, funnels and thimbles frequently require cleaning as often as every day. The frequency with which the mold equipment must be cleaned depends to a certain extent upon the quantity of "mold dope" used by the operator and this quantity of "mold dope" depends to a great extent on the experience of the operator with the type of ware being formed. "Mold dope" is, generally speaking, a graphite and hydrocarbon mixture which is applied to the neck molds and blank molds during the forming of glass articles, such as bottles, as the machines are running and while the mold equipment is relatively hot. It should be understood that in the normal operation of a glass forming machine the molten glass which is deposited in the blank mold may have a temperature of approximately 1800° F. and the inside surfaces of the blank molds and neck molds will frequently run at temperatures in the neighborhood of from 1000° to 1200° F. The exterior of the molds seldom exceeds 600° F.

The "mold dope," being carbonaceous in character with some organic binder included therein, adheres to the mold equipment and if the operator of the forming machine is applying excessive quantities, the exterior of the mold equipment will soon acquire relatively heavy deposits of the "mold dope" thereon.

The accumulation of "mold dope" and other soil on the mold equipment, has two principal detrimental effects. As is well known in the glass forming art, the forming of glassware from a heated supply of molten glass involves the principle of shaping the molten glass while the body of glass is undergoing a continuous cooling process. The accumulation of dirt on the metal mold equipment will result in changing the thermal conductivity of this equipment and thus introduces a serious, unpredictable variable in the continuous cooling cycle that is necessary when making glassware. A second problem that dirty equipment will present is the sticking of mold parts such as neck rings and blank molds in their supporting arms. Most glass forming machines are designed so that their blank molds and neck rings may move slightly in the supporting structure so that they may orient themselves in relation to each other. The orienting movements of the mold equipment are usually slight, however it is this ability of the equipment to adapt that makes it possible to form commercial glassware at relatively high rates of speed. When soil accumulates on the parts they are prevented from making the proper alignments necessary to the successful high speed production of glassware.

With this in view, it can readily be seen that the cleaning of mold equipment becomes a relatively expensive procedure and in those situations where the mold equipment is scratched or scraped by abrasive cleaning, the later grinding and polishing of the mold equipment may throw the mold equipment so far out of tolerance that they will no longer be useable, thus necessitating the scrapping of the mold equipment and requiring the use of new equipment.

With the foregoing in view, it is an object of this invention to provide a method of cleaning mold parts in which physical contacting of the molds by solid abrasives of any kind is unnecessary.

It is a further object of this invention to provide an electrochemical mold cleaning method which has the advantage that no preliminary scraping and no final polishing is necessary.

It is a still further object of this invention to provide a method of cleaning molds and mold equipment in which the molds, after being electrochemically cleaned, may be applied to the machine in which they are used without requiring any additional buffing or polishing.

Other and further objects will be apparent from the following description taken in conjunction with the annexed sheet of drawing, wherein; the single figure is a flow chart of the electrochemical mold cleaning process of the invention.

It has been applicant's experience that in the cleaning of glassware forming equipment, that certain parts are, in normal use, subject to becoming heavily deposited with "mold dope" and oxides, while other mold parts are less heavily deposited. The most troublesome material which adheres to the mold equipment during their normal use is the "mold dope" which becomes baked on and very tenaciously adheres to the surfaces of the mold equipment. For those mold parts or equipment which have heavy deposits thereon, such as neck rings, collars, funnels, guide rings, plungers, blank molds and thimbles, the process varies somewhat from the process for cleaning mold equipment which is not so heavily deposited with "mold dope" and other adhering material.

As indicated in the drawing, the mold parts which have heavy deposits thereon are heated at a temperature between 600° and 1200° F. in the time range of twelve hours to one-half hour, depending upon the heating temperature. A specific example found to be satisfactory was to place the part to be cleaned in an oven preheated to 900° F. for a period of two hours. Heating a piece in the neighborhood of 900° F. is seldom, if ever, heard of in a metal cleaning operation. This is due to the fact that in many metal cleaning operations the primary function is to remove the metal oxides that have been formed due to heat treating, ambient oxidation, or other oxides such as mill scale. Heating a piece of metal in the neighborhood of 900° F. in a non-controlled furnace atmosphere will definitely oxidize the metal surfaces, which creates more work for the chemical cleaners. This coking operation, as carried out in the mold cleaning process of the invention, serves basically three functions. These functions are (1) driving off volatile hydrocarbons from the burned-on carbonaceous material, (2) converting the remaining crystalline carbon to coke or amorphous carbon, and (3) the 900° F. temperature fluctuation will, due to thermal expansion and contraction, fracture some of the oxide surface layers thus loosening a great majority of the carbonaceous material.

As explained above, the mold dopes that are commonly used for lubricants can, for the purpose of this application, be considered to be composed entirely of hydrocarbons. In the glass making operation these hydrocarbons appear to be broken down to carbon plus some sort of a binder that holds the residue in a semi-gummy or plastic state. The temperature of 900° F. is above the volatilization point or the flash point for the great majority of the materials that make up the binders.

Heating the pieces to this temperature will convert some of the carbon from a crystalline state to an amorphous state. This process in commercial applications is termed "coking." The carbon in this state is very loose and non-adherent in a powdery form and can be easily blown away with an air hose or can be washed away with the electrolytic action of an electrolytic chemical operation.

As the pieces are heated and cooled their oxide layers are also heated and cooled. This process presents a thermal expansion as the pieces are heated and a thermal contraction as the pieces are cooled. The rate of thermal expansion and contraction is different for the metals and their oxides. This difference of expansion and contraction rates causes a pulling or stretching of the oxide which will crack it and make it less adherent, thereby being easier to remove in subsequent chemical operations.

Studies have shown that virtually no volatilization or coking occurred at any temperature below 600° F. Even heating for 24 hours at below 600° F. showed little or no effect in the subsequent mold cleaning operation. However, long time runs at temperatures in excess of 600° F., say 700° F. for ten or twelve hours, showed that the carbonaceous material was volatilized and the molding equipment was subsequently easier to clean.

It has been shown that times in excess of two hours at 900° F. are of little value in subsequent cleaning operations, but do tend to increase the oxidation of the pieces considerably.

When the mold parts have cooled sufficiently to be handled, they are loaded onto a supporting rack of special design, which rack provides electrical connections to the mold part itself, while substantially isolating or insulating the rack from the tanks into which the rack will later be placed. The rack provides electrical connections to the mold part of one polarity and provides electrical connections to other parts of the rack of an opposite polarity so as to provide a current path through the mold part to its surface and from the surface of the part, through the solution, to the opposite polarity portions of the rack. The rack itself, in its detail, does not form a part of this invention, with the exception that it is a convenient way to support the mold parts to be cleaned and also provides an electrical connection to the mold part of one polarity and connection to a generally conforming, opposite polarity, electrode.

After the rack has been loaded with the mold parts to be cleaned, it is lowered into a tank containing an electrolytic caustic so that the mold parts are completely immersed therein.

In theory, alkaline solutions partly saponify oils and greases that can be converted into water soluble soaps. Soaps lower the surface tension of the water or solution to the approximate level of the surface tension of the oils and thus lower the inter-facial tension between the oils and the cleaning solution. This permits the cleaning solution to remove films of the petroleum oils used extensively for doping and swabbing operations, and frequently for rust protection. These oils cannot be dissolved or saponified by alkaline solutions in most cases. They can, however, be emulsified, that is, released from the metal surface as tiny globules suspended in the cleaning solutions. These emulsions of oil and cleaning solution can readily be rinsed from the parts being cleaned.

Heat influences the activity of most chemical solutions. Cleaning materials are no exception to this rule. This action, plus the tendency of oils and greases to become less viscous on heating, is used to accelerate most cleaning operations. It was noted that increased temperature did, in most instances, reduce considerably the time required for complete cleaning of the mold parts. Some authorities say that every 20° F. in temperature of a cleaning solution above 140° F. reduces the cleaning time 20%. Thus, the cleaning operations that now require twenty minutes at a temperature of approximately 180° F. may only require ten minutes if the temperature is raised to 200° F. In electrochemical cleaning, increasing the temperature of the cleaning solution lowers its resistance and therefore permits the use of higher current densities to accelerate the cleaning action.

It should also be noted that there is a certain minimum time during which no cleaning action occurs. However, after this short time, about one or two minutes, the cleaning rate progresses very rapidly and then tapers off. As much material is removed in the time between five and ten minutes in the solution as is removed in the period between ten minutes and twenty minutes. When unheated neck rings are placed in the electrolytic caustic tank, it was noted that there was a certain time limit after which no observable cleaning took place. A considerable quantity of material is removed in the first ten minutes, a lesser quantity in the next ten minutes and after this twenty-minute time period, little if any is removed.

The caustic solution in the tank is maintained at a temperature of 180° to 200° F., and mold parts are supported by the rack in the tank for a period of five to twenty minutes, while at the same time D.C. current is passed through the mold part to a generally conforming electrode incorporated in the rack. The electrolytic caustic solution may be a sodium hydroxide solution of 1.5 pounds per gallon of water. The current density of the D.C. current is maintained at between 100 and 300 amperes per square foot. As a specific example, applicant places the mold part in the solution for ten minutes whtile maintaining the current density at 200 amperes per square foot of the surface to be cleaned with the mold part connected anodically. The caustic solution, along with application of D.C. current to the mold part, effectively degreases the mold part, removes loose soil and removes some of the adhering oxides. After the mold part has remained in the bath for approximately ten minutes, it is removed from the caustic solution and rinsed in water at room temperature where the majority of the caustic is removed from the mold parts.

With the completion of the rinsing, which may comprise dunking the parts into and out of a water bath, the parts are placed in an acid pickle bath at room temperature. Pickling is necessary due to the presence of heavy oxide layers on molds and blanks and also due to the fact that oxides are formed on the equipment when the pieces are heated to assist in the removal of carbonaceous materials. It was found that most of this oxide scale could be removed by the periodic reverse unit which will be described later, but the rate of removal was so slow and time consuming in the periodic reverse unit, that it was not feasible or economical. Most pickling operations simply involve the solution of oxide scale in acid. However, it was observed that certain types of inhibited phosphoric acid will turn the black, magnetic $Fe_3O_4$ oxide to the red $Fe_2O_3$ oxide which is more easily removed in the periodic reverse unit. One example of this type of acid is Oakite's #131 which is an inhibited phosphoric acid.

Inhibitors are conventionally added to pickling baths to reduce the amount of attack on the metal areas where the scale is removed. A considerable number of different materials are marketed under various trade names. These materials are liquid or soluble solid and are added to the pickling bath in amounts up to about 10%. The inhibitor normally has no appreciable effect on the rate or scale removed or conversion. The exact mechanism by which these inhibitors function is not conclusively established. However, it is agreed that they form absorbed films on the clean metal surface which prevent further attack on the basic metal.

The mold parts, after immersion in the pickle bath, are rinsed in water at room temperature preparatory to being placed in a bath of caustic maintained at a temperature between 180° and 200° F. with periodic reversed D.C. current applied thereto. During the past several years electrocleaning of glass molds has come to be widely accepted by many companies. In many cases the electrocleaning step is the only one utilized in their process. For the most part this system works to a degree which allows a considerable amount of cleanliness but there is usually some material or soil left on the pieces which must be removed by hand. Basically, there are three separate ways in which electricity may be used in conjunction with a chemical solution to clean metals. A metal part is said to be cleaned with direct current when it is connected as the cathode or negative pole in the tank electrical circuit and cleaned with reverse current when it is connected as the anode or positive pole. The third method is known as periodic reverse in which the part to be cleaned is made alternately the positive and negative electrode in the solution. The following description gives a brief comparison of the three methods.

(a) *Direct current (cathodic) cleaning*

The volume of hydrogen which is liberated at the cathode is theoretically twice that of the oxygen liberated at the anode. Thus, the upward movement of the gas bubbles provides greater solution agitation or action to help remove loosened dirt from the surface of a metal part connected at the cathode. Cleaning is assisted by the fact that the negatively charged part repels negatively charged particles of dirt. One major disadvantage is that the negatively charged metal parts attract positively charged ions of copper, zinc, iron and other metals, some soaps and some colloidal materials in the cleaning solution. This tends to cause them to "plate out" as a loose smut on the metal surface. Another disadvantage is that there is danger that the atomic hydrogen liberated on the metal parts may penetrate the metal surface and become occluded or absorbed by it. Steel and cast iron become very brittle if this gas is not expelled.

(b) *Reverse current (anodic) cleaning*

Because the volume of oxygen liberated at the anode is half that of the hydrogen liberated at the cathode a metal part connected as the anode receives less scouring action from the agitation provided by the gas bubbles. This can be offset, however, by increasing the current density. Cleaning is assisted by the fact that the positively charged metal part repels positively charged particles of dirt. It has been recognized that carbon and some forms of iron oxide act as positively charged particles of dirt and will migrate away from the anode. Another advantage is that the positively charged metal parts do not attract soaps or metal ions which usually form the smut. If such deposits or carbon smuts are on the metal parts, they are repelled or unplated from the surface. There is also no danger of hydrogen embrittlement because the only gas liberated on the metal parts is oxygen. The metal surface does not occlude or absorb oxygen because the oxygen atoms are too large to penetrate the molecular structure of the metals.

(c) *Periodic reverse cleaning*

A periodic reverse type system as was mentioned above alternately varies the charge of the surface to be cleaned. In using a process of this type one reaps the benefits of both the direct current cleaning and the reverse current cleaning. The periodic reverse system also has one distinct advantage of its own and this is of setting up a tremendous turbulence at the metal surface when the polarity is changed. Some authorities believe that this turbulence or violent agitation is caused by the reversing of a polarized film that is immediately adjacent to the metal surface. When a piece is being cleaned electrolytically either anodically or cathodically, the solution in the immediate vicinity of the metal part forms what is termed a polarized film. The other electrodes in the system have a polarized film which is just exactly opposite in polarity to the polarized film set up at the metal piece to be cleaned. When the current is reversed, this polarized film changes immediately to the opposite polarity which involves a 180° turn of all the ions in the neighborhood of the electrodes. The rotation or disturbance of these ions in the polarized film causes the turbulence.

It was determined that the time cycles for the current is very important. If the piece is left cathodic too long iron and other positively charged particles tend to plate out from the solution and cover the piece with a form of smut. Also, as the periodic reverse solution contains a chelating agent such as a Versene or ethylenediamine tetracidic acid which can hold iron suspended in solution, if the piece is made anodic too long there is danger of pitting. It should be pointed out that this danger of pitting is non-existent in a simple caustic solution since iron is insoluble in a castic solution without chelating agents.

It was found that as the solution becomes contaminated with iron the piece must be left anodic much longer than cathodic. When the solutions are new a ten-second direct-ten-second reverse current time is most effective. However, as the concentration of iron in the solution increased, it was necessary to go to ten seconds direct current and fifteen seconds reverse current. Consequently as the iron concentration grew even higher, it was found that it was necessary to change to a five-second direct and thirty-second reverse time cycle.

When the iron ion concentration is kept relatively low, a time cycle of seven seconds direct-fifteen seconds reverse is sufficient to avoid plating iron back on the mold surfaces.

This bath of caustic contains a proprietary chemical such as Oakite Rustripper PR. This chemical is generally a rust and iron oxide scale removing caustic base material. With the part immersed in this solution, periodically reversed D.C. current is fed to the part with a conforming electrode incorporated in the rack. The current density of the periodically reversed D.C. current is in the range of 100 to 300 amperes per square foot. The mold part is maintained within this solution for a period of from five to twenty minutes. As a specific example, a mold part maintained in the tank for ten minutes with the current density at 200 amperes per square foot, with the frequency of reversal on the mold being 15 seconds anodic—7 seconds cathodic was found to be satisfactory. The periodically reversed D.C. current being fed to the mold part which is immersed in the caustic solution will effectively remove all remaining oxides and gives the mold part a bright luster. Furthermore, the caustic will effectively, completely neutralize any acid which may happen to remain on the mold part. It is necessary that the periodic reverse current solution contains some type of a chelating agent if the solution is to be maintained effective on a continuous basis. The reason for this is that the scale removal from the mold surfaces which is basically iron oxide breaks down into iron and oxygen. If a chelating agent is not present this iron would form iron hydroxide which is a jelly-like mass which would precipitate out. This iron hydroxide will form sludge on the bottom of the tank or be carried out on the mold surfaces as a form of smut. The chelating agent in effect ties up the iron in a chelate and prevents its precipitation into the solution. The iron may then be removed from the chelate in a separation operation such as a recirculating plating-out tank.

After removal from the caustic bath, the mold parts are rinsed in water at room temperature to remove a majority of the caustic from the parts and the mold parts are then placed in a tank containing water and an anti-rust compound or rust inhibitor for a period of approximately thirty seconds. This hot-rinse, inhibited bath is maintained at a temperature of 160° to 180° and upon removal of the parts from the hot rinse, the rust inhibitor will prevent rusting of the parts in storage and the heat of the hot rinse will insure that the parts will self-dry in the air.

After removal from the hot rinse tank, the parts are air dried and are ready to be put in storage or returned to use on a forming machine.

The above described method is that which was found necessary when cleaning mold parts which have relatively heavy deposits thereon.

It should be kept in mind, and as indicated on the accompanying flow chart, it is not necessary to heat the mold parts for as long a time prior to their introduction into the first caustic bath when the parts are not heavily soiled. Thus, the initial heating step which it has been found necessary when cleaning heavily soiled mold parts may be modified as respects time of heating when cleaning those mold parts which normally do not have heavy deposits thereon, such as blow molds, bottom plates, baffles and blow heads.

For example, when cleaning mold parts that are not subjected to heavy deposits of mold dope, the heating may involve only a thirty-minute period in the 900° F. oven.

Other and further modifications may be resorted to within the spirit and scope of the appended claims.

I claim:

1. The method of cleaning ferrous metal mold equipment contaminated by a mold dope residue comprising graphite, hydrocarbon and organic material comprising the sequence of steps of heating the equipment to a temperature in the range of 600° F. to 1200° F., subjecting the equipment to electrolysis in a conductive medium having a high concentration of an alkali metal hydroxide with the equipment connected anodically, contacting the equipment with an acid, subjecting the acid treated equipment to electrolysis in a conductive medium having a high concentration of an alkali metal hydroxide and rinsing the equipment.

2. The method as set forth in claim 1 wherein the heating of the equipment is for a period of two hours at 900° F.

3. The method as set forth in claim 1 wherein the first-mentioned conductive medium is a solution of NaOH and water maintained at a temperature of between 180° F. and 200° F.

4. The method as set forth in claim 1 wherein the acid is an inhibited phosphoric acid solution having a concentration of 5–25%.

5. The method as set forth in claim 1 wherein the second named conductive medium is a rust and scale removing caustic base solution.

6. The method as set forth in claim 1 wherein the time of electrolysis in each of the conductive mediums is from 5 to 20 minutes.

7. The method as set forth in claim 1 wherein the step of subjecting the acid treated equipment to electrolysis comprises subjecting the equipment to alternate anodic and cathodic electrolysis.

8. The method as set forth in claim 7 wherein the period of anodic electrolysis is in the range of 10 to 30 seconds and the period of cathodic electrolysis is in the range of 5–15 seconds.

9. The method of cleaning ferrous metal mold equipment contaminated by a mold dope residue comprising graphite, hydrocarbon and organic material comprising the steps of heating the equipment in the range of 600° F. to 1200° F., placing the equipment in a first heated bath containing a high concentration of an alkali metal hydroxide electrolyte, passing D.C. current through the equipment while in the first bath and while the equipment is connected as the anode, rinsing the equipment, placing the rinsed equipment in an acid bath, rinsing the acid from the equipment, placing the acid treated equipment in a second heated bath containing a strong alkali metal hydroxide electrolyte, passing periodically reversed D.C. current through the equipment while immersed in said second heated bath, rinsing the equipment after removal from the second caustic bath, placing the equipment in a heated rinse containing a rust inhibitor and permitting the equipment to air dry after removal from the heated rinse.

10. The method as set forth in claim 9 wherein said first bath contains a relatively highly soluble alkali.

11. The method as set forth in claim 9 wherein said first bath contains NaOH in the concentration of 1.5 pounds per gallon of water.

12. The method as set forth in claim 9 wherein the temperature of the first bath is maintained between 180° and 200° F.

13. The method as set forth in claim 9 wherein the D.C. current applied to the equipment has a current density between 100 and 300 amperes per square foot.

14. The method as set forth in claim 9 wherein the period of immersion of the equipment in the first bath is 5–20 minutes.

15. The method of cleaning ferrous metal mold equipment contaminated by a mold dope residue comprising graphite, hydrocarbon and organic material comprising the steps of heating the equipment at a temperature in the range of 600–1200° F., placing the equipment in a first heated bath containing a high concentration of an alkali metal hydroxide electrolyte, passing D.C. current through the equipment while in the first bath with the equipment connected anodically, rinsing the equipment, placing the rinsed equipment in an acid bath, rinsing the acid from the equipment, placing the equipment in a second heated bath containing a strong alkali metal hydroxide electrolyte, passing periodically reversed D.C. current through the equipment while immersed in said second heated bath and rinsing the equipment after removal from the second caustic bath.

16. The method as set forth in claim 15 wherein the periodically reversed D.C. current is connected to the equipment for a period of 5–20 minutes.

17. The method as set forth in claim 15 wherein the D.C. current applied to the equipment has a current density between 100 and 300 amperes per square foot.

18. The method as set forth in claim 15 wherein the period of reversal of the D.C. current is in the range of 5 to 30 seconds.

19. The method as set forth in claim 18 wherein the period of reversal of the D.C. current is such that the equipment is connected anodically for a period of 10 to 30 seconds and cathodically for a period of 5 to 15 seconds.

References Cited by the Examiner

UNITED STATES PATENTS

| | | | |
|---|---|---|---|
| 1,600,355 | 9/1926 | Otis et al. | 204—145 |
| 2,820,003 | 1/1958 | Logan et al. | 204—150.5 |
| 2,973,307 | 2/1961 | Hahn | 204—34 |
| 3,096,261 | 7/1963 | Mekjean | 204—141 |

JOHN H. MACK, *Primary Examiner.*

R. MIHALEK, *Assistant Examiner.*